June 27, 1967   A. S. LOUIS ET AL   3,328,707
WIPER ASSEMBLY FOR POTENTIOMETERS
Filed June 1, 1965   3 Sheets-Sheet 1
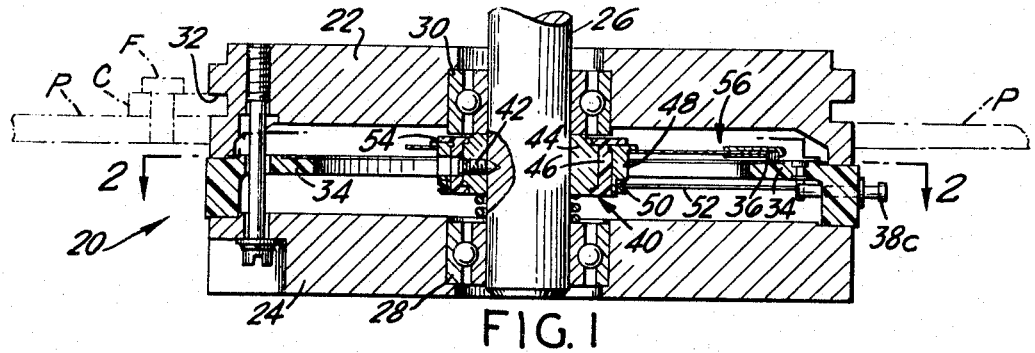
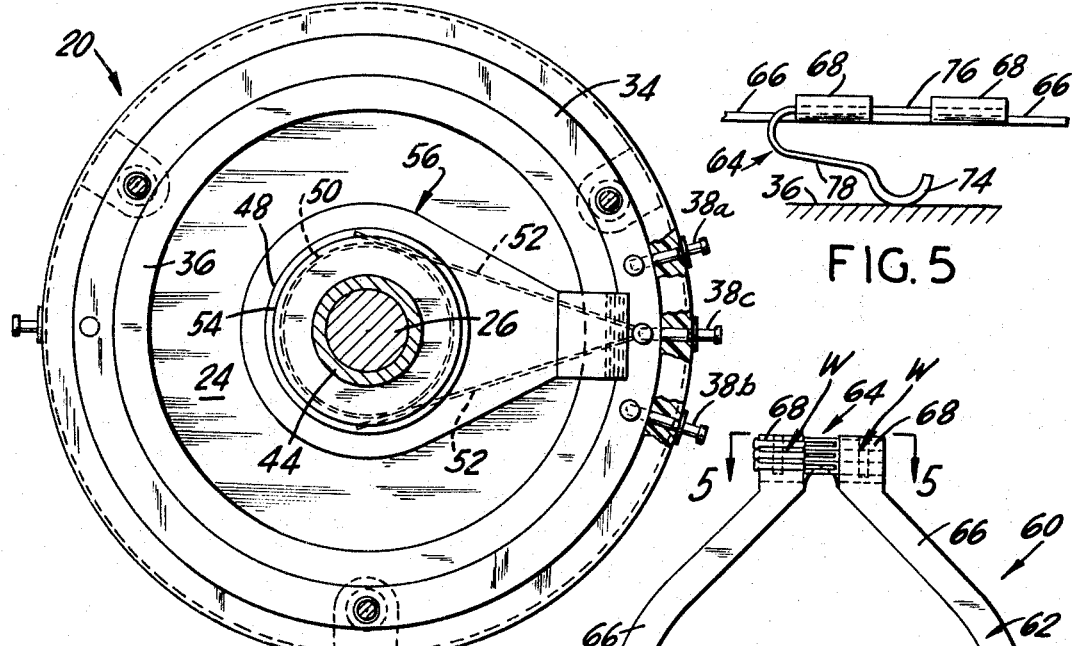
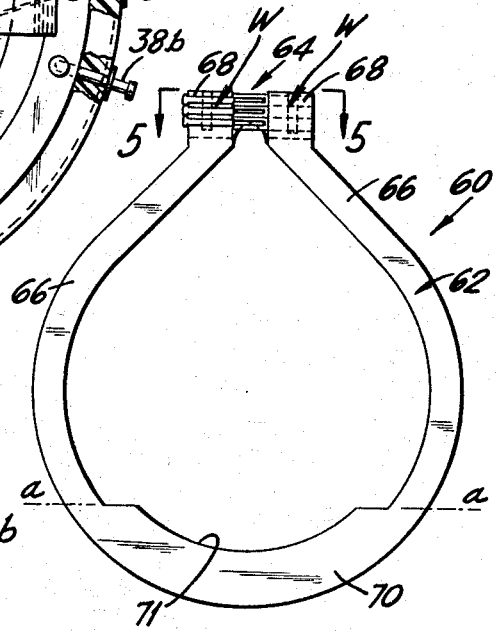
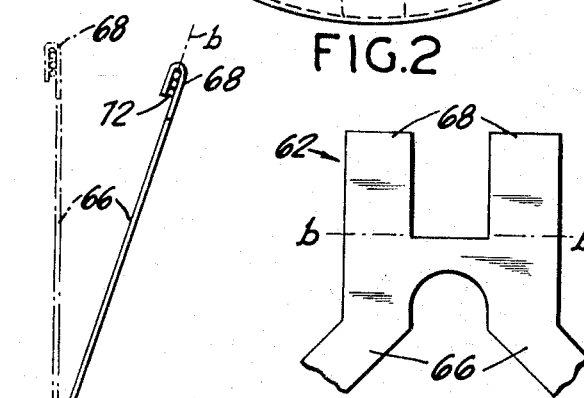
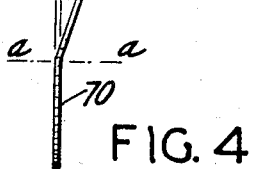
INVENTORS.
ARNOLD S. LOUIS
PAUL V. De LUCA
BY
Leonard H. King
ATTORNEY.

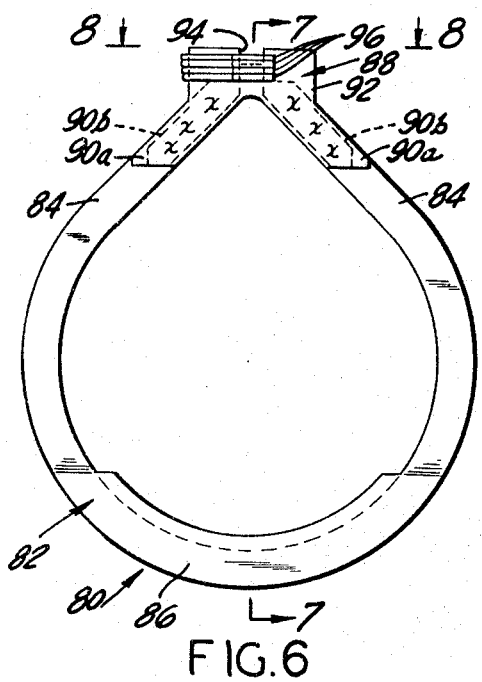
FIG. 6
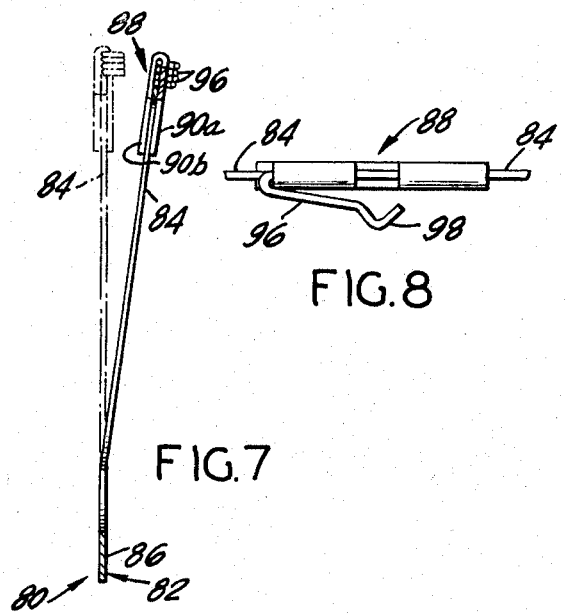
FIG. 7
FIG. 8
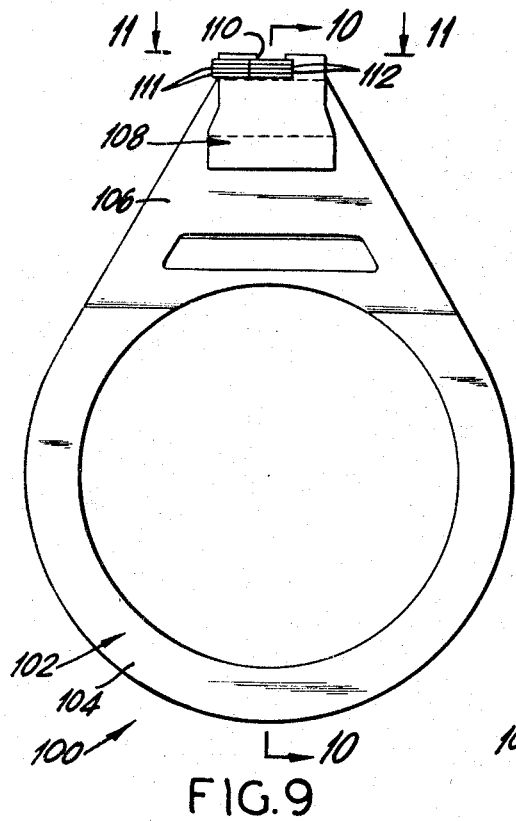
FIG. 9
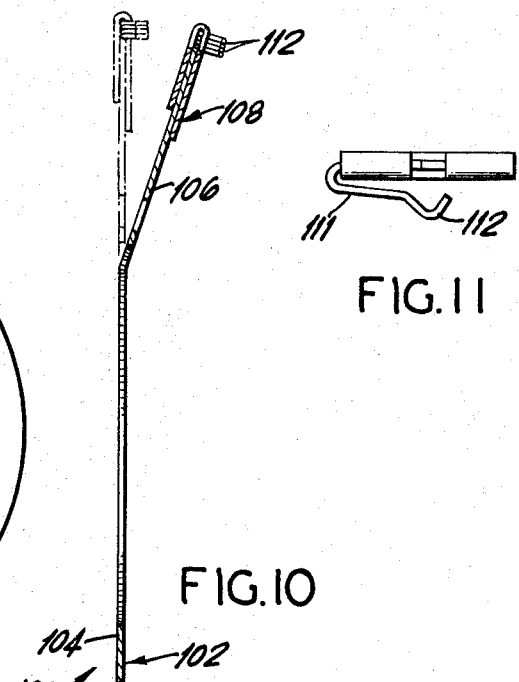
FIG. 10
FIG. 11
INVENTORS
ARNOLD S. LOUIS
PAUL V. De LUCA
BY
Leonard H. King
ATTORNEY.

INVENTORS.
ARNOLD S. LOUIS
PAUL V. De LUCA
BY
Leonard H. King
ATTORNEY.

United States Patent Office 3,328,707
Patented June 27, 1967

3,328,707
WIPER ASSEMBLY FOR POTENTIOMETERS
Arnold S. Louis, Hastings on Hudson, and Paul V. De Luca, Jackson Heights, N.Y., assignors to Markite Corporation, New York, N.Y.
Filed June 1, 1965, Ser. No. 460,349
10 Claims. (Cl. 338—202)

This invention relates generally to precision potentiometers and more particularly to an improved wiper assembly therefor.

In either a rotary or a rectilinear potentiometer, the fixed end of the wiper assembly is rigidly secured to a displaceable shaft. The opposite or free end of the wiper assembly contacts and slides on the resistance element. It is imperative, in the interest of maintaining good electrical continuity during operation, that the wiper remain constantly in close contact with the resistance element. In order to accomplish this the wiper arm itself is resilient and is mounted in cantilevered fashion on the displaceable shaft. In addition, the contacting end of the wiper assembly is provided with a precious metal element.

Precision potentiometers are becoming increasingly smaller in both size and weight due to their application as components of missile guidance systems, computers, etc. It is therefore becoming increasingly difficult and costly to assemble the contact elements to the wiper arm by mass production techniques. This problem is particularly evident where multifinger contacts are employed.

The present invention is directed towards solution of the particular problems relating to the manufacture of wiper assemblies for small, precision potentiometers. A plurality of individual precious metal contact fingers are each secured to and bent under the free end of the wiper arm so that the resilient, cantilevered wiper arm is prevented from touching the resistance element. In addition, that portion of each of the contact fingers positioned between the wiper arm and the resistance element is disposed parallel with the resistance track at the point of contact. Thus in a rotary potentiometer the fingers are perpendicular to the radial line extending from the center to the point of contact. This construction tends to reduce chatter of the wiper arm due to the lateral component of forces thereon.

It will be seen that when the present invention is used with a rotary potentiometer, there is a minimum contact finger tab size for a given track diameter. In order to make the wiper assembly contact fingers perpendicular to a theoretical radial line, it has in the past been necessary to provide an arcuate extension to the wiper arm. This of course has been eliminated by the underslung feature of the present invention.

As a further improvement in the wiper assembly, the cross sectional configuration of the spring finger contacts has been altered to assure ease of handling and to prevent misalignment thereof. The particular contact construction of the present invention also provides greater compliancy which results in a more desirable spring rate. As a result lower wiper pressure may be used. As will be explained hereinafter, longer life and lower noise will be achieved.

Several embodiments of the present invention will be described and illustrated. All of the features and advantages described hereinabove are available in each embodiment. While the present invention will be described with respect to a rotary potentiometer, it is to be understood that the basic concept is applicable to a rectilinear potentiometer. Further, by using contact fingers embodying the design of this invention, either an underslung or an in-line configuration may be used. It should be noted however that the in-line construction is the less desirable of the two since it will not positively prevent the wiper arm from touching the resistance track.

Accordingly, it is an object of the present invention to provide an improved wiper assembly for a precision potentiometer.

Another object is to provide an improved multifinger wiper assembly.

An additional object is to provide an improved contact member for a potentiometer wiper assembly.

A further object is to provide an underslung contact for a potentiometer wiper assembly whereby the need for an extension member is eliminated.

A still further object is to provide a potentiometer wiper assembly that is easier to assemble and wherein the likelihood of contact misalignment is eliminated.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

In the drawing:

FIG. 1 is a side elevation view of a rotary potentiometer employing one embodiment of the present invention;

FIG. 2 is a plan view, taken along line 2—2 of the FIG. 1 potentiometer;

FIG. 3 is an enlarged plan view of one embodiment of the improved wiper assembly;

FIG. 3A is a fragmentary plan view of the wiper spring of FIG. 3 prior to forming;

FIG. 4 is a side elevation of the embodiment illustrated in FIG. 3;

FIG. 5 is an end elevation view taken along line 5—5 of FIG. 3;

FIG. 6 is an enlarged plan view of an alternative embodiment of the wiper assembly;

FIG. 7 is a cross sectional view in elevation taken along line 7—7 of FIG. 6;

FIG. 8 is an end view taken along line 8—8 of FIG. 6;

FIG. 9 is an enlarged plan view of still another alternative embodiment of the wiper assembly;

FIG. 10 is a cross sectional view in elevation taken along line 10—10 of FIG. 8;

FIG. 11 is an end view taken along line 11—11 of FIG. 9; and

Figure 6A:
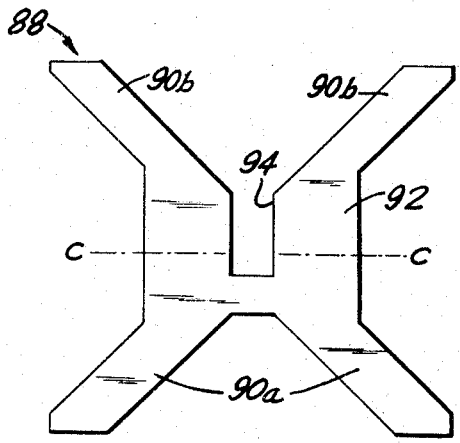
FIG. 6A is a plan view of the contact holder of FIG. 6 prior to forming.

Referring now to the drawing, FIG. 1 and FIG. 2 in particular are utilized by way of example to illustrate one possible environment of the present invention. Compact, precision type rotary potentiometer 20 is comprised of housing portions 22 and 24 and a central shaft 26 journaled concentrically therein by means of bearings 28 and 30. Servo flange 32, in combination with a plurality of dog-type clamps C and fasteners F serve as one of several conventional means for mounting the potentiometer housing on panel P. A disc-shaped, insulating base member 34, having a circular, conductive resistance track 36 comolded therewith, is sandwiched between housing portions 22 and 24 such that it is concentric with shaft 26. A plurality of terminals 38a, 38b and 38c (FIG. 2) are radially disposed in the base member 34 in order to provide an electrical path between certain internal portions of the potentiometer and an external utilization device.

FIG. 1 and FIG. 2 also illustrate a typical brush block 40 which would incorporate the wiper assembly of the present invention. Brush block 40 is rigidly secured to shaft 26 by means of set screw 42. The brush block is comprised of an inner sleeve 44, an intermediate insulating sleeve 46 and an outer, conductive sleeve 48. Additionally, there is attached on brush block 40 a V-shaped hub portion 50 which, together with the sleeves, is concentric and rotatable with shaft 26 and in electrical contract with outer conductive sleeve 48. Hairspring wiper 52 is secured to terminal 38c such that its spaced legs ride in the V-shaped groove in hub portion 50 as it rotates. A flange 54 on outer sleeve 48 provides convenient mounting means for a typical brush assembly which is designated generally by reference character 56.

FIGS. 3, 3A, 4 and 5 illustrate the preferred embodiment of the present invention. Brush assembly 60 is comprised of a circular spring member 62 and a plurality of wiper contacts 64. Considering spring member 62 alone for the moment, a material found suitable therefor is 0.0060 inch thick, half-hard beryllium copper which is heat treated to provide strength and to maintain dimensional accuracy. Spring member 62 is comprised of leg portions 66, tabs 68 and an arcuate base portion 70. Arcuate portion 70 seats on flange portion 54 of outer sleeve 48 to provide a soldering edge along segment 71. The spring member bends between its loaded and unloaded positions (FIG. 4) along line $a$—$a$ (FIG. 3). For purposes to be discussed hereinafter, tabs 68 are bent over along line $b$—$b$ (FIG. 3A) whereby there are a pair of confronting parallel surfaces spaced from each other to define a channel 72 therebetween.

Figure 12:
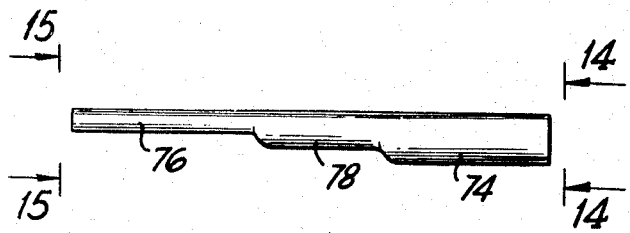
FIGS. 12-15 are, respectively, enlarged plan, side and end elevations of the improved wiper assembly's contact finger prior to forming.
Figure 14:
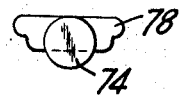
Figure 13:
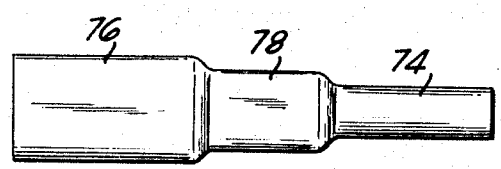
Figure 15:

The configuration of the contact fingers 64 may best be seen in FIG. 5 and FIGS. 12–15. A preferred material is "Paliney 7," a precious metal alloy produced by the J. M. Ney Co. as 0.007 inch diameter stock. However, other similar materials having good spring properties and comparable wear characteristics may also be employed. End 74 is left with its original circular cross section and is formed into an arc in order to provide only tangential contact with resistance track 36 (FIG. 5). End 76 is flattened out to an extent where it is approximately 0.003 inch thick and 0.010 inch wide. When three or four fingers are to be assembled in channel 72, the flattened section prevents them from turning. Moreover, the flattened portion makes these relatively small and delicate elements easier to handle as well as automatically providing the proper lateral spacing between the fingers at their arcuate end 74. Since end 76 is wider than end 74 when the fingers are assembled in side-by-side abutment with each other there will be an accurate and easily repeated gap between each element.

Midsection 78 of finger or brush 64 may also be flattened but to a somewhat lesser extent so that its thickness is approximately 0.004 inch thick and it is approximately 0.008 inch wide. Midsection 78 is flattened at the point of maximum cantilever stress. While this is not absolutely essential, this reduced section does provide a greater compliance or softer spring rate. It is particularly useful where a low brush pressure is required and it also has been found that the number of fingers per brush assembly may safely be reduced from four previously used to three.

In the final assembly (FIG. 3) the brush fingers 64 are mechanically attached to the spring member 62 by the folding over of tabs 68. In addition, the brush fingers are physically attached by means of welding both sides of each tab and by soldering. The brush fingers are cross-welded at the four interfacial surfaces marked W in FIG. 3. This sets up a metal barrier due to the fusion of fingers 64 to tabs 68. Solder, which is placed in the opening or gap defined by the adjacent tabs is thereby prevented from running out the side of the tab in between the wires.

The total space between the topmost portion of tab 68 and the arcuate end 74 of the fingers that ride on the resistance track is in the order of only 0.065 inch. By virtue of the underslung configuration of the wiper fingers, the flat spring member 62 of the brush assembly will not contact the resistance track.

FIGS. 6, 6A, 7 and 8 illustrate an alternative embodiment 80 of the underslung wiper assembly. Beryllium copper spring member 82 is circular in shape and rectangular in cross section. The spring member is comprised of legs 84 and a base portion 86 which is secured to the brush block integral with the central shaft in a similar manner to that described hereinabove. Wiper holder, or tab 88, is made from dead soft beryllium cooper approximately 0.006 inch thick. In the loaded condition (FIG. 7) the force of the spring member typically is 50±10 grams.

Tab 88 is substantially X-shaped (FIG. 6A) having legs 90$a$ and 90$b$ as well as a central portion 92 provided with a slot 94. The tab is bent along line $c$—$c$ and, together with four wiper fingers 96, is welded in three places marked X to legs 84 of spring member 82. Initially, the wiper fingers are in the form of rods (0.007 inch diameter Paliney 7 or other similar material) but after the tabs are welded to the spring member, the fingers are given a reverse bend to achieve the underslung configuration. Hook portion 98 (FIG. 8) is then formed and solder is added through slot 94 in tab 88.

Figure 9A:
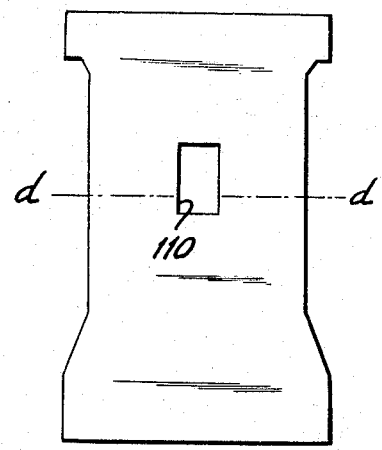
FIG. 9A is a plan view of the contact holder of FIG. 8 prior to forming.

FIGS. 9, 9A, 10 and 11 illustrate still another alternative embodiment 100 of a wiper assembly having underslung contact fingers. The assembly procedure and technique is substantially the same as the prior embodiment. However, a somewhat larger beryllium copper spring member 102 is employed for those applications where size is not quite as critical a factor. Whereas in the previous embodiment, the radial distance from the center of the shaft to the center of brushes is typically 0.35 inch, in the embodiment of FIG. 9, the same dimension is 0.75 inch. It is to be understood that both of the aforementioned measurements are for the brush assembly in the loaded position and represent the radial distance from the center of the potentiometer to the center of the resistance track.

Spring member 102 has a base portion 104 provided with an aperture therein that permits it to be soldered to the brush block as explained hereinabove. The opposite, free end 106 has side walls sloping inwardly from the base portion. Tab member 108 (FIG. 9A) is bent along line $d$–$d$ and is welded to end 106 together with the wiper fingers. Solder is added through aperture 110 and the wiper fingers 111 are bent over to the underslung position before the hook 112 is formed (FIG. 11).

Each embodiment of the improved wiper assembly incorporates wiper contacts having at least one portion thereof as a circular cross section and another substantially flattened cross sectioned portion. Thereby, increased reliability in a compact, precision potentiometer is assured. By incorporating the improved wiper element disclosed hereinabove, the assembly techniques for an extremely small and delicate component are materially improved. It is particularly noteworthy that the present invention completely eliminates the need for the arcuate extension of the wiper arm.

The advantages of a rectangular cross section at the point where the wiper is secured to the brush block is that greater resiliency can be obtained in a given space. Also, the cross sectional dimension can be selectively fabricated to achieve the desired spring rate (force-to-deflection ratio) with greater accuracy. This tangential track contact and greater compliancy can be combined in a single element. The effect of the better spring rate is directly reflected in better wear characteristics since a substantially lower wiper pressure may be employed. It has been observed in tests that a 10-gram pressure on a contact of the present design resulted in only small resistive changes in the track after approximately 3.5 million cycles of the brush block. By way of contrast, prior designs using 55-gram pressure resulted in excessively large resistive changes at 2 million cycles. It may therefore be said that use of the present invention permits the use of substantially lower wiper loads which directly results in a longer more useful potentiometer life.

It is to be understood that while the wiper fingers have been shown U-shaped in each embodiment, for certain applications, they may be straight, or in-line, having only a single longitudinal axis. However, as previously mentioned, the use of the in-line configuration results in a loss of some of the advantages of the present invention. Similarly while each embodiment shows a rotary potentiometer, the same brush principles could just as well be utilized on a rectilinear potentiometer. It should also be pointed out at this time that while the contact holding end of each spring member has been illustrated and described in the several embodiments as having a pair of laterally spaced tabs defining an aperture therebetween, the scope of the invention is not limited to such construction. A solid, one-piece, bent over tab without any aperture could also be employed although somewhat less effectively. It is a feature and advantage of the present invention that the solder joint may be visually inspected by means of the aperture. Thus, bad solder connections or those susceptible to early failure may be quickly detected thereby achieving the objective of providing an improved wiper assembly.

There has been disclosed heretofore the best embodiments of the invention presently contemplated and it is to be understood that various changes and modifications may be made by those skilled in the art without departing from the spirit of the invention.

What is claimed is:

1. An improved wiper assembly for a precision potentiometer having a displaceable shaft and a resistance track disposed in the housing thereof, said wiper assembly comprising:
    (a) a flexible conductive spring member secured to the shaft and extending outwardly therefrom in a plane substantially parallel to the plane of the resistance track; and
    (b) a plurality of resilient, conductive brushes each having a first end, second end and a central portion, said first end portion being flat in cross section and secured to said spring member in parallel relationship, said second end portion being circular in cross section and adapted to slidably traverse the resistance track, said first end portions being in side-by-side abutting relationship whereby said second end portions are transversely spaced from each other.

2. The apparatus of claim 1 wherein said brushes are U-shaped with said first end and said second end portions comprising the legs thereof.

3. The apparatus of claim 1 wherein each of said second end portions includes an arcuate hook portion adapted to slidably traverse the resistance track.

4. The apparatus of claim 1 wherein said central portions are flat in cross section and have a thickness dimension greater than said first end portions and less than said second end portions.

5. An improved wiper assembly for a precision potentiometer having a rotatable shaft and a resistance track disposed in the housing thereof, said wiper assembly comprising:
    (a) a flexible conductive spring member comprising a base portion secured to the shaft and a resilient cantilevered portion extending radially therefrom in a plane substantially parallel to the plane of the resistance track, said cantilevered portion having tape members at the outer end thereof, said tape members being folded over on themselves to define a channel; and
    (b) a plurality of resilient conductive brushes each having first end, second end and a central portion, said first end portion being flat in cross section and secured to said spring member in parallel relationship, said second end portion being circular in cross section and adapted to slidably traverse the resistance track, said conductive brushes being rigidly secured within a channel formed by said tape members, whereby said conductive brushes are parallel to the plane of the spring member and perpendicular to a theoretical radial line extending from the center of the shaft through the spring member.

6. The apparatus of claim 5 wherein said tab members are comprised of a plate member rigidly secured to said cantilevered portion of said spring member, said brush being rigidly secured to said plate member.

7. The apparatus in accordance with claim 6 wherein said plate member is provided with two pairs of legs, one of said pairs of legs being secured to the outer end of said cantilevered portion of said spring member, the other of said pairs of legs being folded over to define a narrow channel therebetween, said brush member being rigidly secured in said channel.

8. The apparatus of claim 7 wherein said plate member is substantially X-shaped.

9. The apparatus of claim 7 wherein said plate member is substantially rectangular and is provided with a central aperture, said plate member in the folded condition having said two pairs of legs spaced from each other by said central aperture.

10. An improved brush member for a potentiometer having a displaceable wiper assembly and a resistance track disposed in the housing thereof, said brush member comprising a first end portion, a second end portion and a central portion, said first end portion being flat in cross section and secured to the wiper assembly, said second end portion being circular in cross section and adapted to slidably traverse the resistance track, wherein said central portion is flat in cross section and has a thickness dimension greater than said first end portion and less than said second end portion.

References Cited

UNITED STATES PATENTS

| 2,291,246 | 7/1942 | Marsten | 338—168 |
| 2,760,036 | 8/1956 | Raymer | 338—202 X |
| 2,956,253 | 10/1960 | Clavton et al. | 338—171 X |
| 3,010,090 | 11/1961 | Vacha | 338—202 X |
| 3,119,088 | 1/1964 | Fliegler et al. | 338—171 |

FOREIGN PATENTS

| 372,433 | 5/1932 | Great Britain. |
| 367,156 | 6/1939 | Italy. |

RICHARD M. WOOD, *Primary Examiner.*

J. G. SMITH, *Assistant Examiner.*